Dec. 8, 1970          P. M. ARONSON ET AL          3,545,919
              RADIATION COMPENSATING PRESSURE SENSOR
Filed May 15, 1968                              2 Sheets-Sheet 1

INVENTORS
Philip M. Aronson
Ronald M. Culpepper

United States Patent Office 3,545,919
Patented Dec. 8, 1970

3,545,919
RADIATION COMPENSATING PRESSURE SENSOR
Philip M. Aronson and Ronald M. Culpepper, Silver Spring, Md., assignors to the United States of America as represented by the Secretary of the Navy
Filed May 15, 1968, Ser. No. 729,284
Int. Cl. G01n 33/22; G01l 9/04
U.S. Cl. 73—35                                4 Claims

ABSTRACT OF THE DISCLOSURE

A pressure responsive apparatus having a hollow cylindrical beam which is subjected to strain in response to a fluid pressure force when exerted on a piston integrally formed on the front of the beam while the rear end of the beam is held against movement. A pair of active semiconductor strain gages are bonded to the outer surface of the beam, and a pair of inactive semiconductor strain gages are housed within the hollow cylindrical beam adjacent the rear end theref and disassociated from the strain sensitive portion of the beam.

BACKGROUND OF THE INVENTION

This invention relates generally to pressure responsive apparatuses, and more particularly to apparatus responsive to pressure from a nuclear explosion.

Since the advent of the nuclear age it has become increasingly important to understand the scientific phenomenon associated with nuclear explosions. The characteristics of a nuclear explosion are unique, and in their investigation it has been necessary at times to resort to the use of somewhat unorthodox methods and apparatuses. One such characteristic which has been extremely difficult to predict or determine is the pressure surrounding the nuclear fireball during and after an explosion.

Several diverse arrangements have been heretofore proposed to measure the pressures generated by a nuclear explosion in the atmosphere. Due to the high temperature and radiation effects generated by a nuclear explosion, all of the conventional pressure sensing devices have been ineffective. A strain sensitive compressible device utilizing foil gages has been proposed, and although relatively uneffected by the high temperatures and radiation effects of the explosion, the foil gages were not sensitive enough to accurately sense the relatively low to medium pressures generated by a nuclear explosion.

SUMMARY OF THE INVENTION

Accordingly, one object of this invention is to provide a new and improved pressure responsive apparatus for sensing the pressure characteristics near a nuclear explosion.

Another object of the invention is the provision of a new and improved pressure responsive apparatus which is self correcting for the radiation effects of a nuclear explosion.

One other object of this invention is the provision of a new and improved self compensating highly sensitive pressure responsive apparatus capable of sensing low to medium pressures in a high temperature and radiation environment.

Briefly, in accordance with one embodiment of this invention, these and other objects are attained by providing a combination of a vessel having an outer wall with an ablative material covering capable of being subjected to the surrounding atmosphere of a nuclear explosion, a bore in the outer wall of the vessel and extending therethrough, a hollow cylindrical beam disposed in the bore the front end of which comprises a piston formed integrally therewith and having a sliding fit in the bore adjacent the outer surface of the outer wall which is adapted to axial movement in response to a fluid pressure force applied thereto from the nuclear explosion, and the rear end of which is held against movement in the bore. An intermediate portion of the beam is subject to strain in response to the fluid pressure force.

A pair of active semiconductor strain gages is bonded to the outer surface of the beam, and a pair of inactivated semiconductor strain gages is secured within the beam adjacent to the rear end thereof and disassociated from the intermediate portion.

BRIEF DESCRIPTION OF THE DRAWINGS

A more complete appreciation of the invention and many of the attendant advantages thereof will be readily appreciated as the same becomes better understood by reference to the following detailed description when considered in connection with the accompanying drawings wherein.

DESCRIPTION OF THE PREFERRED EMBODIMENT

Figure 1:
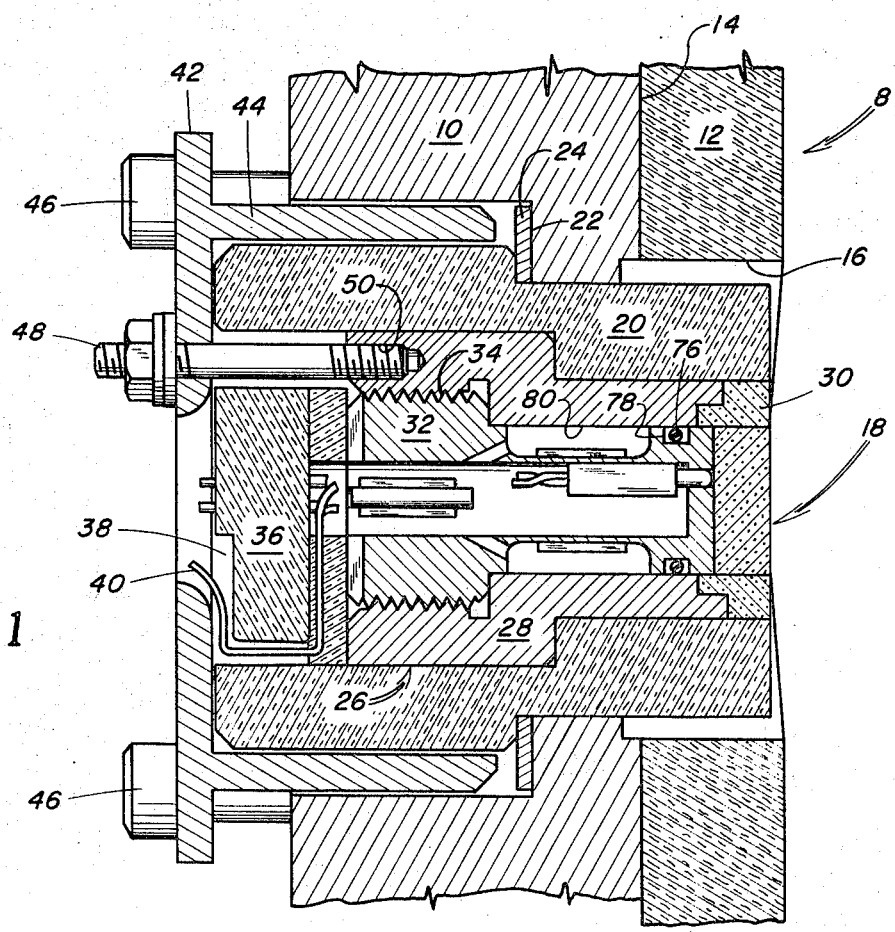
FIG. 1 is a sectional view of the pressure sensor of the present invention mounted within the wall of an instrumentation vessel.

Referring now to the drawings wherein like reference characters designate identical or corresponding parts throughout the several views, and more particularly to FIG. 1 thereof wherein is shown an instrument canister or vessel 8 having an outer wall 10 with an ablative heat resistant material covering 12 bonded to the outer surface 14 thereof. The vessel 8, containing various types of instrumentation, is ejected into the atmosphere in close proximity to the fireball of a nuclear explosion to sense and record the various characteristics of the nuclear explosion. The wall 10 and covering 12 are apertured at 16 to permit a pressure sensor indicated generally at 18 to extend to the outer surface thereof for sensing the fluid pressure force generated by the nuclear explosion. An essentially cylindrically shaped heat resistant ablative sleeve 20 separates the pressure sensor 18 from wall 10 and seats against flange 22 of wall 10 with a flat ring shaped sealing member 24 therebetween. A generally cylindrically shaped sensor housing 26 having a body portion 28 constructed of metal, such as aluminum, and a heat resistant cap portion 30 of a heat resistant material such as pyrolytic graphite is securely disposed within sleeve 20 in close engagement therewith. The rear end portion 32 of pressure sensor 18 is threadedly secured within body portion 28 of housing 26 as shown at 34. A disc of heat resistant material 36 seats within sleeve 20 in close engagement therewith and comes into engagement with the rear end portion 32 of pressure sensor 18. The disc 36 has various cutout portions 38 formed therein for allowing the routing of wires 40 from the pressure sensor 18 into the interior of instrument canister 10. A clamp 42, having an integrally formed cylindrical flange portion 44 extending between wall 10 and sleeve 20, secures the pressure sensor 18 and surrounding structure within the outer wall 10 of the instrument vessel 8 by means of bolts 46 extending through the clamp 42 and threadedly engaging wall 10. To further secure and stabilize the pressure sensor housing 26 a plurality of bolts 48 are provided to extend through clamp 42 and disc 36 to threadedly engage threaded recesses 50 formed in one end of housing 26.

Figure 2:
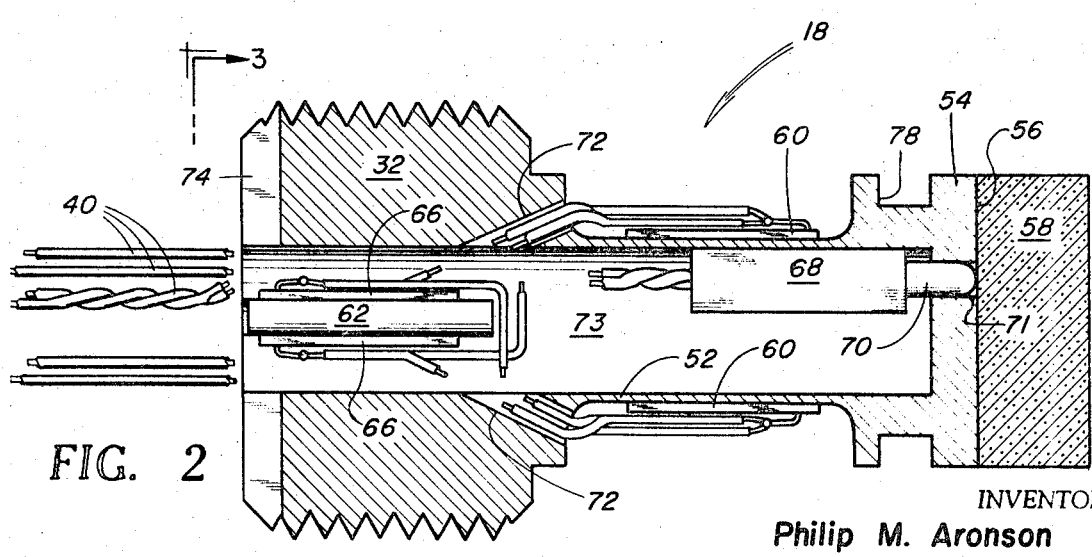
FIG. 2 is an enlarged longitudinal sectional view of the pressure sensor of the present invention.

As more clearly shown in FIG. 2, the pressure sensor 18 has a centrally located hollow thin walled cylindrical beam section 52 with a piston 54 formed integrally on the forward end thereof, and the threaded stationary member 32 formed integrally on the rear end thereof. On the forward planar face 56 of piston 54 is bonded a heat resistant covering 58 such as pyrolytic graphite. The beam 52, at least at its intermediate portion is subjected to strain in response to a fluid pressure force being exerted on piston 54. A pair of active semiconductor strain gages 60 is bonded to the outer surface of the beam 52 for sensing the strain experienced by the beam.

Figure 3:
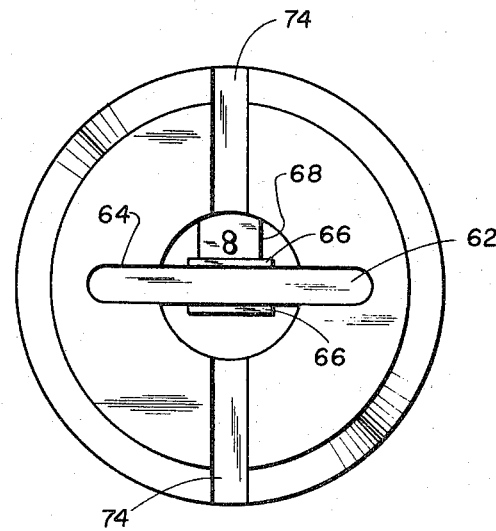
FIG. 3 is a plane end view taken along the line 3—3 of FIG. 2.

As shown in FIGS. 2 and 3, a flat support member 62 is held within an elongate slot 64 formed in the rear end portion 32 of pressure sensor 18, and has a pair of inactive semiconductor strain gages 66 bonded to the opposing surfaces thereof. A temperature sensing member such as thermistor 68 is provided within hollow beam member 52 and has a temperature sensor portion 70 thereof extending through an aperture 71 formed in piston 54 in contact with the heat resistant covering 58. The wires for active strain gages 60 extends through apertures 72 into the hollow portion 73 of pressure sensor 18, and all of the internal wiring of the pressure sensor then extends back through the rear end 32 of the pressure sensor to be connected to conventional recording equipment (not shown) within the vessel 10. As more clearly shown in FIG. 3, pair of slots 74 are radially formed on the rear face of pressure sensor 18 thereby enabling the pressure sensor to be engaged by a bifurcated tool (not shown) to assist in securing the pressure sensor to the housing 26 within the vessel outer wall 10.

Referring again to FIG. 1, it can be seen that an O-ring 76 is provided within a circular groove 78 formed on the outer surface of piston 54, thus providing a resilient effective shield between the piston 54 and a hollow bore 80 within housing 26 sufficient to prevent leakage of high pressure gas therebetween while allowing axial movement of the piston within the bore.

As the vessel 8 is subjected to a nuclear explosion in the atmosphere the fluid pressure force created by the explosion will be exerted against piston 54 causing the piston to slidingly move within bore 80, thus compressively straining beam 52. The active semiconductor strain gages 60 sense the strain experienced by beam 52 which is representative of the pressure, but are also affected by the high temperature and radiation resulting from the explosion. The inactive semiconductor strain gages 66 will also experience the high temperature and radiation resulting from the explosion, but since not in engagement with beam 52 will not experience the strains resulting from the fluid pressure. All of the strain gages, due to the nature of semiconductors, will be affected by temperature and radiation to the same degree (by a change in resistance).

Although the strain gage may be destroyed or rendered useless by the high temperature and radiation of the explosion, the recording equipment located internally of vessel 10 is protected by the heat resistant shield around the pressure sensor created by members 12, 20 and 36.

Figure 4:
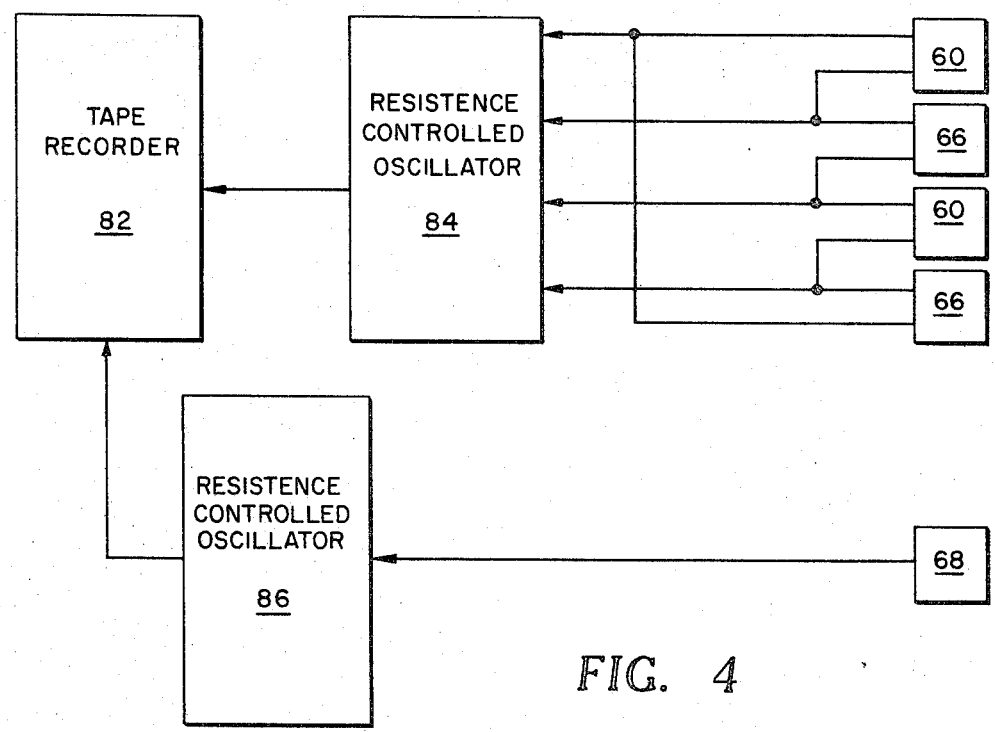
FIG. 4 is a schematic diagram of the electrical connections between the various semiconductor strain gages of the present invention.

As shown in FIG. 4, the active semiconductor strain gages 60 and the inactive semiconductor strain gages 66 are integrally connected in a bridge type arrangement so as to compensate for the high temperature radiation effects created by the explosion, thus giving only a pressure indication which may be recorded in a conventional tape recorder 82 which is responsive to the output of a resistance controlled oscillator 84, the frequency of which in turn varies in accordance with any resistance unbalance in the bridge arrangement effectuated by a pressure indication. Similarly the temperature experienced by the strain gages may be sensed by a thermistor 68 and recorded by tape recorder 82 in accordance with the output of a resistance controlled oscillator 86.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. Apparatus responsive to pressure from a nuclear explosion comprising a vessel having an outer wall,
   an ablative material covering on said outer wall capable of being subjected to the surrounding atmosphere of a nuclear explosion,
   a bore defined in said outer wall perpendicular to said ablative material covering and extending therethrough,
   a hollow cylindrical beam diposed in said bore and having a front end and a rear end,
   said front end providing a piston and having a sliding fit in said bore adjacent the outer surface of said outer wall,
   said piston being axially slideable within said bore in response to a fluid pressure force applied thereto from said nuclear explosion,
   means disposed within said vessel for maintaining said rear end of said beam immovable within said bore,
   said beam having a intermediate portion subject to flexure in response to the axial movement of said front end,
   a pair of active semiconductor strain gages bonded to the outer surface of said beam,
   a pair of inactive semiconductor strain gages positioned within said hollow cylindrical beam adjacent said rear end and disassociated from said intermediate portion and
   circuit means responsive to said active and inactive strain gages for providing an indication of the magnitude of said pressure generated by said explosion.

2. The apparatus of claim 1 further comprising a shield of heat resistant material separating said beam and the interior of said vessel.

3. The apparatus of claim 2 further comprising a heat resisting covering disposed on the forward face of said piston.

4. The apparatus of claim 1 further comprising an annular groove defined about the outer cylindrical portion of said piston, and
   an O-ring disposed within said groove thereby providing a resilient effective shield between said piston and said bore sufficient to prevent leakage of high pressure gas therebetween while allowing movement of said piston within said bore.

UNITED STATES PATENTS
References Cited

| | | | |
|---|---|---|---|
| 2,327,935 | 8/1943 | Simmons | 73—398(R)XR |
| 2,472,045 | 5/1949 | Gibbons | 73—398(R) |

JAMES J. GILL, Primary Examiner

U.S. Cl. X.R.

73—393, 398, 419